PIVOTALLY MOUNTED CARTRIDGE

Filed Feb. 25, 1964 2 Sheets-Sheet 1

Inventors:
Martin C. Reed
William R. Baillie
By: Hofgren, Wegner, Allen, Stellman & McCord
Attorneys Dec. 27, 1966 M. C. REED ETAL 3,294,403

PIVOTALLY MOUNTED CARTRIDGE

Filed Feb. 25, 1964 2 Sheets-Sheet 2

3,294,403
PIVOTALLY MOUNTED CARTRIDGE

Martin C. Reed and William R. Baillie, Roselle, Ill., assignors to Warwick Electronics Inc., a corporation of Delaware Filed Feb. 25, 1964, Ser. No. 347,207
6 Claims. (Cl. 274—23)

This invention relates in general to a tone arm and cartridge assembly, and more particularly to a balanced tone arm having a retractable cartridge mechanism.

In the record playing art, tone arms have generally consisted of an elongated member mounted adjacent its rearward end to a motor board for pivotal movement about a vertical axis, with a cartridge pick-up device being carried at the forward end and having a stylus that is adapted to track the spiral groove of a record being played. While such devices have met with wide commercial acceptance, their performance characteristics have been less than satisfactory in several important respects. For example, when a downward force is applied to known types of tone arms, the stylus carried by the cartridge digs into the record surface, causing damage to both the stylus and to the record. Also, when a downward and sideward force is applied to known types of tone arms, the stylus is forced across the record grooves, which also damages the stylus and the record surface. To obviate these problems, it has been proposed in the prior art to yieldably mount a cartridge to a tone arm by the use of spring means, so that the stylus will be capable of a limited degree of movement toward the tone arm when a downward or sideward force is imparted to the tone arm. Such devices have not proven completely satisfactory, in that as the spring means which are used to yieldably mount the cartridge become compressed, they resist the relative movement of the cartridge toward the tone arm with an increasing force.

It is, therefore, the general purpose of the present invention to provide an improved tone arm and cartridge assembly which obviates the problems encountered in prior art devices.

A more specific object of the invention is to retractably mount a cartridge upon a tone arm so that the force required to move the cartridge relative to the tone arm does not increase as the cartridge nears the tone arm.

Another object of the invention is to provide a retractable cartridge for a tone arm which will completely withdraw the cartridge stylus from engagement with the record surface when a downward force is applied to the tone arm.

A further object of the invention is to provide a tone arm with smooth means, having a low coefficient of friction, that is slidable over a record surface without marring, when a downward force is applied to the tone arm.

Still another object of the invention is to provide improved means for balancing a tone arm and cartridge assembly, so that the cartridge stylus will ride upon the record surface with a desired amount of tracking force.

A still further object of the invention is to provide a tone arm and cartridge assembly as set forth in the preceding paragraph with means for adjusting the stylus tracking force.

And another object of the invention is to provide an improved tone arm and cartridge assembly wherein the tracking force of the cartridge stylus is determined by the cartridge alone, and not by the tone arm.

And a further object of the invention is to retractably mount a cartridge on a tone arm in such a manner that the cartridge stylus will engage the record with a substantially constant force regardless of the vertical position of the cartridge relative to the tone arm.

And still another object of the invention is to provide a balanced tone arm and cartridge assembly wherein the cartridge is rectractably mounted on the tone arm, and wherein the cartridge stylus engages a record surface with a desired tracking force without any springs being present to resiliently mount the cartridge or to bias it toward the record.

Further objects and advantages will become apparent from the following detailed description taken in connection with the accompanying drawing, in which.

Figure 1:
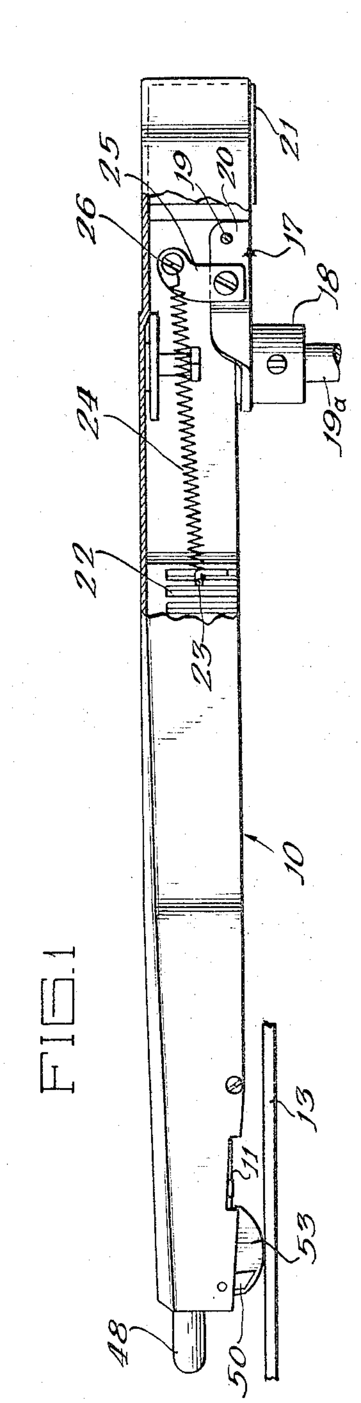
FIG. 1 is a side elevational view of a preferred embodiment of the tone arm and cartridge assembly, with certain parts being broken away for clarity, and with the cartridge in a retracted position.

While this invention is susceptible of embodiment in many different forms, there is shown in the drawing, and will herein be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing, wherein like reference characters designate like or corresponding parts throughout the several views, the illustrated embodiment of the tone arm 10 is provided with a cartridge 11 adjacent one end thereof, which includes a stylus 12 that is adapted to track the spiral groove on a record 13, as is well known in the art. Tone arm 10 is defined by a downwardly open housing, which includes a top wall 14 and depending side walls 15 and 16. A link 17 is mounted on tone arm 10, adjacent the right hand end thereof, as viewed in FIG. 1, and includes a generally vertically disposed pivot portion 18, which mounts tone arm 10 for horizontal pivoting movement about a vertically extending shaft 19*a*, which extends above the record changer motor board. A rearwardly extending portion 20 of link 17 is secured to tone arm 10 by a transversely extending pin 19 that extends between sides 15 and 16, and which mounts tone arm 10 for vertical pivoting movement. A counterweight 21 is provided at the right hand end portion of tone arm 10, as viewed in FIG. 1, and FIG. 2, and functions to balance tone arm 10, as is hereinafter explained in detail.

A plurality of tranversely aligned, generally vertically extending grooves 22 are provided in tone arm sides 15 and 16 at a point spaced outwardly from link 17. A plate 23 is positioned in an aligned pair of slots 22, and retains one end of a spring 24. The other end of spring 24 is fixed to an arm 25, carried by link 17, at a point 26 which is vertically spaced from pivot 19, so that spring 24 functions in combination with counterweight 21 to urge tone arm 10 in clockwise direction, as viewed in FIG. 1. As can be best seen in FIG. 2, spring 24 is at an angle to pivot 19, thus positioning link 17 against tone arm side 16. The accurate positioning of tone arm 10 against link 17 allows a weight 21 to be accurately placed on tone arm 10 to laterally balance the tone arm about pivot 19*a*. This lateral balance of tone arm 10 allows stylus 12 of cartridge 11 to follow a record groove more accurately, when the unit to which tone arm 10 is attached by pivot 19 is inclined or acted upon by an external force.

A cartridge mounting bracket 28 (FIG. 7) is secured between tone arm sides 15 and 16, adjacent the forward end of tone arm 10 for vertical pivoting movement of the cartridge, by a transversely extending screw 29, or equivalent pivot member. The side portions 30 and 31 of bracket 28 are enlarged as at 32 and 33, respectively, to embrace the rearward end of cartridge 11. Portions 32 and 33 are preferably provided with threaded holes for reception of screw 29, and such an arrangement has been found to produce a pivotal mounting having exceptionally low friction characteristics. Washers 29*a*, preferably formed of an impregnated nylon material, are received on screw 29, and are interposed between the facing surfaces of hubs 15*a* and 16*a*, that are provided on the inner surfaces of sides 15 and 16, respectively, and the sides 30 and 31 of bracket 28, to reduce the friction between the tone arm and the bracket. The rear end of cartridge bracket 28 is open, as at 36, to receive leads, not shown, which are connected to the cartridge terminals. A mounting arm 38 is secured to the upper portion 37 of bracket 28, and extends forwardly therefrom. A cartridge supporting clip 40 is secured to the underside of arm 38, and includes downwardly extending ends 41 and 42, which are slotted for reception of corresponding tabs on the end portions of cartridge 11. Clip 40 is formed of a resilient material, so that the cartridge 11 may be easily inserted between ends 41 and 42. A downwardly bent tab 43 is provided at the side of arm 38, the purpose of which will hereinafter appear.

A narrowed end portion 45 of arm 38 extends outwardly from tone arm 10 through an opening 46 in the front wall 47. A mass 48 is provided on the end portion 45 of arm 38, and functions to produce the desired tracking force of stylus 12, as will hereinafter be more fully explained. Arm portion 45 may be threaded, as at 49, so that the mass 48 may be adjusted therealong, to provide means for varying the tracking force of stylus 12.

Figures 2, 6, 7:
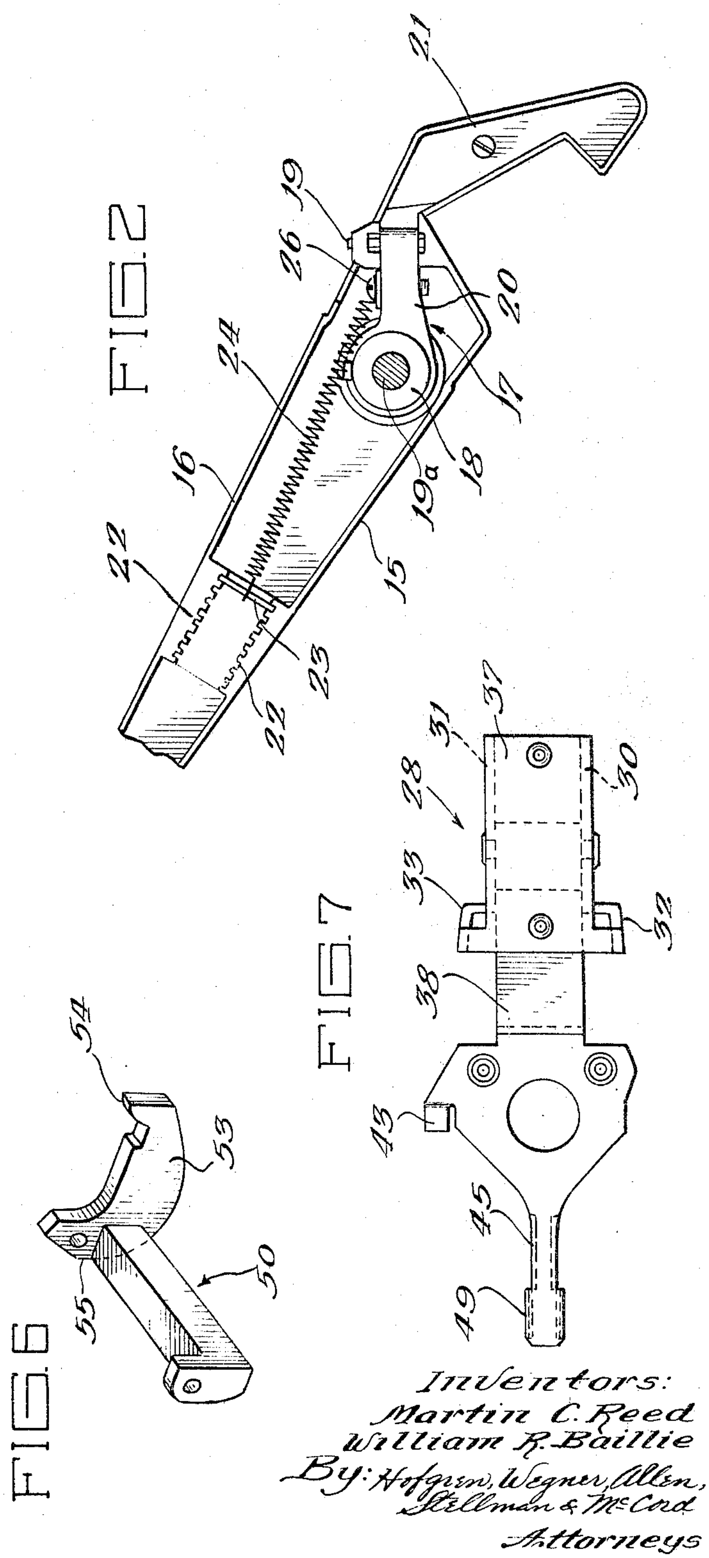
FIG. 2 is a fragmentary bottom plan view of one end of the structure shown in FIG. 1.
FIG. 6 is an enlarged perspective view of a preferred embodiment of the bumper used in the present invention.
FIG. 7 is a top plan view of the cartridge mounting means.
Figure 3:
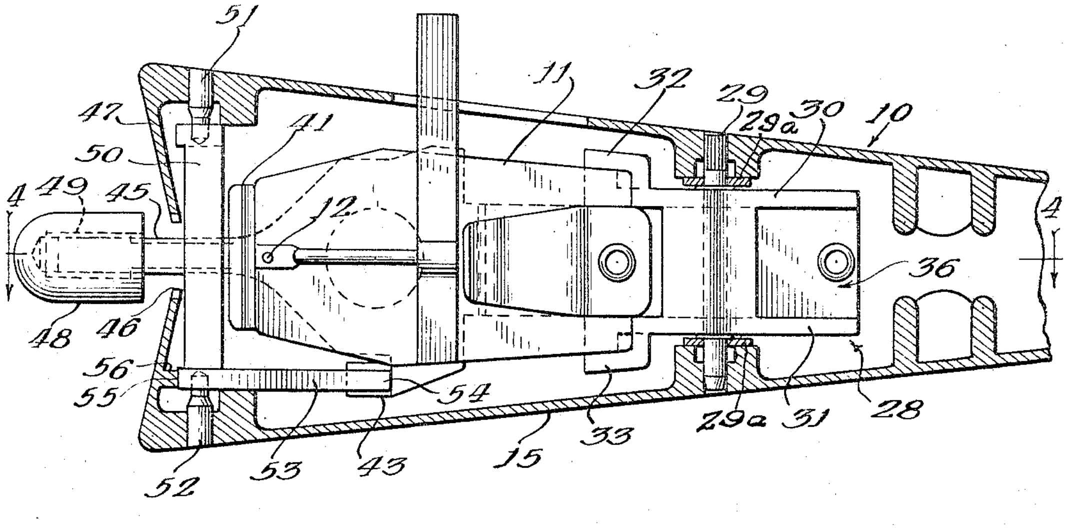
FIG. 3 is an enlarged fragmentary bottom plan view of the other end of the structure shown in FIG. 1.
Figure 5:
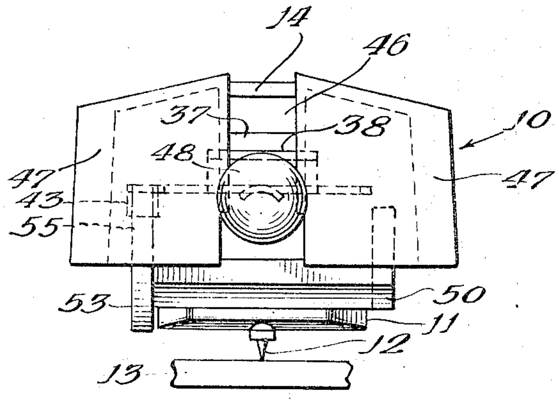
FIG. 5 is an end view of the structure shown in FIG. 3.
Figure 4:
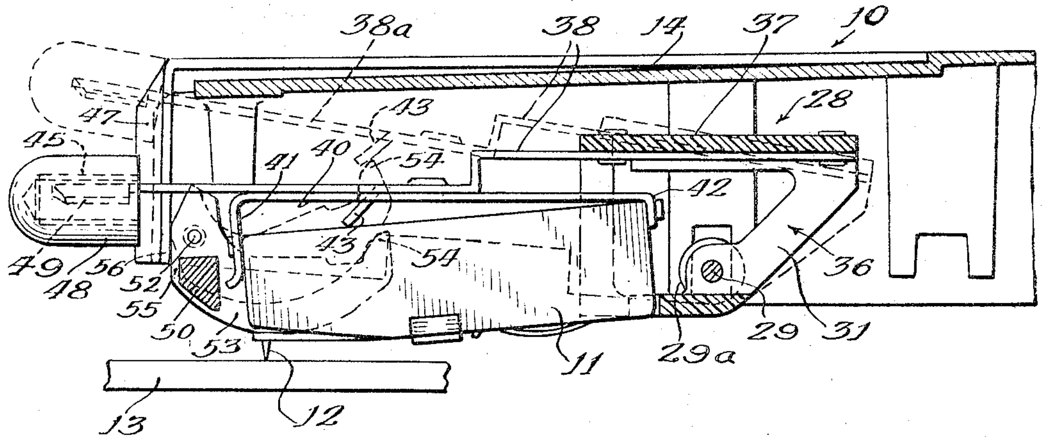
FIG. 4 is a sectional view taken susbtantially as shown along line 4—4 in FIG. 3.

A bumper 50 is pivotally secured to the forward end of tone arm 10 by aligned, transversely extending pivot pins 51 and 52. Bumper 50 includes a rearwardly extending arm 53, which terminates in an abutment 54. Tab 43 is positioned on the arc of travel of abutment 54, so that as arm 53 is pivoted, abutment 54 will engage tab 43 to lift arm 38 relative to the tone arm 10. A stop 56 (FIG. 3) is provided on the inside of end wall 47 of tone arm 10, and engages the planar front wall 55 of bumper 50, to properly locate arm 53 in the full line position shown in FIG. 4. In this position, bumper arm 53 is spaced from record 13, and stylus 12 tracks record 13 to play the information recorded thereon. When abutment 54 engages tab 43 to move arm 38 to the broken line position shown at 38*a* in FIG. 4, cartridge 11 is completely withdrawn into the interior of the tone arm, as is best seen in FIG. 1.

The magnitude of weights 21 and 48; the relative positions of pivots 19, 29, and stylus 12; the positioning of spring anchor 26 in relation to pivot 19; and the position of plate 23; are each selected so as to create a balanced tone arm and cartridge assembly, which will "float" over the record being played. The weight of the tone arm 10 is selected so that in the absence of the cartridge structure, the counterweight 21, in combination with spring 24, would function to pivot the tone arm in a clockwise direction as viewed in FIG. 1. Thus, when the cartridge structure is added to the tone arm, the magnitude of the tracking force of stylus 12 is determined by the cartridge structure alone. It will be understood that the engagement of stylus 12 with the record being played creates a fulcrum about which mass 48 acts. A corresponding reaction force is imparted to tone arm 10 through pivot 29. The weight of the cartridge structure is selected so that the magnitude of the reaction force at pivot 29, in combination with counterweight 21 and spring 24, will offset the combined weight of the tone arm portion which extends forwardly of pivot 18, and the weight of the cartridge structure, so that a balanced tone arm is produced.

It will be readily apparent that since no springs are required to bias the cartridge structure toward the record, when a downward force is applied to the tone arm, the cartridge structure will be retracted into the tone arm, and there will be no increase in resistance as the cartridge approaches the tone arm. When a downward force is applied to the tone arm, abutment 54 will engage tab 43 to pivot the cartridge structure into the tone arm, and completely withdraw stylus 12 from engagement with the record as is seen in FIG. 1. Since the distance between the axis of pins 51 and 52 and abutment 54 is less than the distance between pivot 29 and stylus 12, abutment 54 will travel a greater distance along its arc of movement than will stylus 12, when a downward force is applied to the tone arm, and thus the cartridge structure will be withdrawn into the tone arm at an accelerated rate when abutment 54 engages tab 43. When the cartridge structure is in the retracted position, as shown in FIG. 1, only the smooth undersurface of bumper arm 53 engages the record. Bumper 50 is preferably formed of a smooth, plastic material having a low coefficient of friction, such as the plastic available from E. I. du Pont de Nemours and Company under the trademark "DELRIN," so that the tone arm can be moved laterally across a record without damaging the record grooves. Since the combined mass of the cartridge 11 and its mounting structure is substantially less than the mass of the tone arm, stylus 12 will tend to remain stationary in the record groove, even when vertical forces cause the tone arm itself to oscillate and move relative to the record, which ordinarily would cause the stylus to skip over record grooves and damage the record. Thus, it will be apparent that the present invention enables a stylus to track a record with a constant stylus force so that recordings may be reproduced with more clarity than was heretoforce possible, while also preventing damage to the record itself.

From the foregoing it should be apparent that each of the objects of the invention have been fully achieved.

We claim:

1. In a tone arm and cartridge assembly, the combination comprising: a support; a tone arm; means mounting said tone arm to said support for pivotal movement about a first axis 19; first means 21 biasing said arm in one direction about said axis; and second means for balancing said tone arm including, pivot means carried by said arm defining a second axis 29, a cartridge mounted in said pivot means and having a stylus spaced from said second axis adapted to track a record, the engagement of said stylus with a record defining a fulcrum, a mass 48 carried by said cartridge and spaced outwardly from said fulcrum, said cartridge and mass together having sufficient weight to overcome said first means, the reaction force of said mass pivoting around said fulcrum acting at said second pivot to create a force acting in the same direction as said first means to balance said tone arm.

2. A tone arm and cartridge assembly comprising, in combination: a support; a tone arm; means mounting said tone arm on said support for pivotal movement about both a first horizontal axis and a vertical axis; and means for balancing the weight of said tone arm including, a counterweight positioned on one side of said horizontal axis, a cartridge, means pivotally securing said cartridge to said tone arm on the other side of said horizontal axis for pivotal movement about a second horizontal axis, a stylus carried by said cartridge at a point spaced from said second horizontal axis and adapted to track a record, a mass secured to said cartridge and spaced outwardly from said stylus, the weight of said mass and its spacing from said stylus being selected so as to provide a desired stylus tracking pressure by pivoting said cartridge around said second horizontal axis, the reaction force of said weight acting at said pivot creating an upward force and acting in combination with said counterweight to balance the weight of said arm and retain said assembly in a balanced condition.

3. A tone arm and cartridge assembly comprising: a support; a tone arm; means mounting said tone arm on said support for pivotal movement about both a vertical and a first horizontal axis, with a major portion of said tone arm extending on one side of said horizontal axis; a counterweight on said tone arm on the other side of said horizontal axis and biasing said tone arm in one direction about said horizontal axis; spring means connected between said tone arm and said mounting means to bias said tone arm in said one direction; the magnitude of said counterweight, in combination with the strength of said spring means, defining a first force which is sufficient to overcome the weight of said tone arm major portion; a cartridge; a stylus carried by said cartridge and adapted to track a record, the engagement of said stylus with a record defining a fulcrum; means pivotally securing said cartridge to said tone arm major portion for pivotal movement about a second horizontal axis; and a mass carried by said cartridge and spaced outwardly from said fulcrum; the magnitude of the weight of said tone arm major portion, in combination with the weight of said cartridge and mass, defining a second force which is sufficient to overcome said first force and urge said tone arm in a second direction about said first horizontal axis; the magnitude of the reaction force of said mass acting at said second horizontal axis urging said tone arm in said first direction and producing a balanced tone arm.

4. A tone arm and cartridge assembly as defined in claim 3 wherein means are provided for adjusting the bias of said spring means.

5. A tone arm and cartridge assembly as defined in claim 3 wherein means are provided for adjusting the position of said mass relative to said fulcrum.

6. A tone arm and cartridge assembly comprising: a support; a tone arm; means mounting said tone arm on said support for pivotal movement about both a vertical and a first horizontal axis, with a major portion of said tone arm extending on one side of said horizontal axis; a counterweight on said tone arm on the other side of said horizontal axis and biasing said tone arm in one direction about said horizontal axis; spring means connected between said tone arm and said mounting means to bias said tone arm in said one direction; the magnitude of said counterweight, in combination with the strength of said spring means, defining a first force which is sufficient to overcome the weight of said tone arm major portion; a cartridge; a stylus carried by said cartridge and adapted to track a record, the engagement of said stylus with a record defining a fulcrum; means pivotally securing said cartridge to said tone arm major portion for pivotal movement about a second horizontal axis between a first playing position wherein said stylus is disposed below said tone arm and a second position wherein said stylus is retracted within said tone arm; a bumper carried by said tone arm and adapted to engage a record when said cartridge is in said retracted position; means mounting said bumper for pivotal movement relative to said tone arm when said bumper engages a record; abutment means carried by said bumper for engaging said cartridge to move said cartridge to the retracted position; and a mass carried by said cartridge and spaced outwardly from said fulcrum; the magnitude of the weight of said tone arm major portion, in combination with the weight of said cartridge and mass, defining a second force which is sufficient to overcome said first force and urge said tone arm in a second direction about said first horizontal axis; the magnitude of the reaction force of said mass acting at said second horizontal axis urging said tone arm in said first direction and producing a balanced tone arm.

References Cited by the Examiner

UNITED STATES PATENTS

| | | | |
|---|---|---|---|
| 2,660,437 | 11/1953 | Harman ---------- | 274—23 X |
| 3,139,284 | 6/1964 | Hammond ----------- | 274—24 |
| 3,175,828 | 3/1965 | Jacque et al. ---------- | 274—24 |

NORTON ANSHER, *Primary Examiner*.

CLIFFORD B. PRICE, *Assistant Examiner*.